United States Patent Office 3,819,688
Patented June 25, 1974

3,819,688
PROCESS FOR THE PREPARATION OF PEROXY ACIDS
Leonard S. Silbert and Dolores A. Konen, Philadelphia, Pa., assignors to the United States of America as represented by the Secretary of Agriculture
No Drawing. Filed Nov. 10, 1970, Ser. No. 88,490
Int. Cl. C07c 73/10
U.S. Cl. 260—502 R     11 Claims

ABSTRACT OF THE DISCLOSURE

Peroxy acids are prepared by perhydrolysis with highly concentrated hydrogen peroxide of a mixed anhydride of an appropriate carboxylic acid such as a diethyl phosphoric-carboxylic acid anhydride. Although perhydrolysis is usually effected by catalysis with methanesulfonic acid, catalysis was not required in at least one case. Both aliphatic and aromatic peroxy acids containing either electron-donating or electron-accepting groups can be prepared indicating that the process of the invention is general in scope and is utilizable with compounds having a broad range of carbon chain lengths. Yields of peroxy acids above 70% are easily obtained.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to a process for the preparation of peroxy acids and more specifically to a process in which peroxy acids are prepared by perhydrolysis of diethyl phosphoric-carboxylic acid mixed anhydrides. Peroxy acids are useful agents for the oxidation of compounds such as nitriles and olefinic and sulfur compounds. Epoxides prepared by peracid oxidation of olefins are useful as plasticizers and stabilizers for polymers.

The preparation of peroxy acids is well known in the art. For example, one method uses methanesulfonic acid as a solvent and catalyst (J. Org. Chem. 27, 1336, 1962). However, in many cases this method requires elevated temperatures to accelerate the reaction rate and to solubilize the acids and esters to be perhydrolyzed. Consequently, because of the unstable nature of many peroxy acids, the method is not recommended for general use.

In view of the above and also in view of the fact that some peroxy acids have never been prepared because of their inherent instabilities, there is a need for a mild procedure to prepare peroxy acids, especially those that are difficult to obtain or that are obtained in poor yields by present methods.

It is therefore an object of the present invention to provide a novel process for the preparation of peroxy acids.

Another object of this invention is to provide a method for making peroxy acids that cannot be made by current standard procedures.

A further object of this invention is to provide a process for preparing peroxy acids in which the reaction conditions are not severe.

According to this invention, the above objects are accomplished by a process in which a mixed anhydride of the desired carboxylic acid, such as a diethyl phosphoric-carboxylic acid anhydride of the general structure

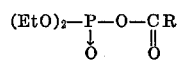

in which R is alkyl, aryl, or aralkyl, generally of, but not limited to, between 2 and 24 carbon atoms, is perhydrolyzed with highly concentrated hydrogen peroxide. The perhydrolysis is usually effected by catalysis with methanesulfonic acid. However, in at least one case, perhydrolysis was effected without acid catalysis. In addition, both aliphatic peroxy acids and aromatic peroxy acids containing either electron-donating or electron-accepting groups can be prepared indicating that the process of this invention is somewhat general in scope.

Yields of peroxyanisic acid using known techniques [J. Phys. Chem. (U.S.S.R.), 4, 721, 1933 and Bull Soc. Chim. (France), 1401 (1959)] were poor, generally below 33%. Using the process of this invention, yields of 75% were easily obtained. Two unstable peroxybenzoic acids, each of which contain electron-donating groups, 3,4,5-trimethoxyperoxybenzoic and 2,4,6 - trimethylperoxybenzoic acids, were easily prepared in yields up to 70% by the process of this invention. The former compound has not yet been prepared by any other known method. The scope of the process of this invention is further exemplified by the fact that the aliphatic peroxy acid, peroxystearic acid, and peroxybenzoic acids containing electron-donating nitro groups, o- and p-nitroperoxybenzoic acids, were obtained in yields up to 80%.

The mixed anhydride of the desired carboxylic acid is prepared by reacting in ethyl ether solution the silver salt of diethyl phosphoric acid, silver diethyl phosphate, with the appropriate acyl halide. Although it may be possible to use potassium or other alkali salts, the silver diethyl phosphate, which is easy to prepare and dry, is preferred. In this manner, the diethyl phosphoric-carboxylic acid anhydride of the following acids were prepared: stearic; anisic; 3,4,5-trimethoxybenzoic; 2,4,6-trimethylbenzoic; p-nitrobenzoic; o-nitrobenzoic; cinnamic; and pivalic. Preparation of the mixed anhydride is depicted in equation 1:

(1)

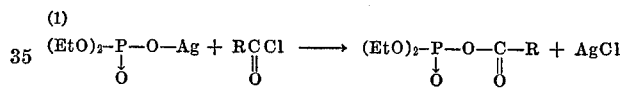

Perhydrolysis of the mixed anhydrides is depicted in equation 2:

(2)

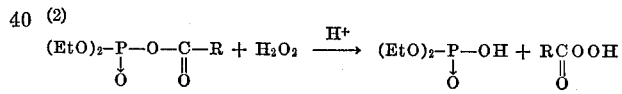

The invention is more fully illustrated in the following examples, and in Table I which shows the ratio of reactants and the yields of each of the examples.

EXAMPLE 1

(a) *Anisic-Diethyl Phosphoric Anhydride.*—Anisoyl chloride (8.50 g.; 0.05 mole) was added dropwise to a stirred slurry of silver diethylphosphate (19.6 g.; 0.075 mole) in ethyl ether (150 ml.). The mixture was stirred for one hour and the silver chloride and silver diethyl phosphate were removed by filtration. After refiltration through about 1.0 g. of Florisil to remove traces of silver, a light oil (13.5 g., 94% yield) was obtained by evaporation of the solvent.

(b) *Peroxyanisic Acid.*—The mixed anhydride (5.00 g., 0.0176 mole) and methanesulfonic acid (0.034 g., 0.0035 mole were dissolved in ethyl ether (3 ml.) and hydrogen peroxide, 98% concentration (3.06 g., 0.09 mole) was added at 10–15° C. The mixture was warmed to and stirred at room temperature for 90 minutes. Ice-cold water was added and peroxyanisic acid (2.8 g.) was isolated by ether extraction and evaporation. The crude product, 84% peroxy acid, was purified by crystallization from a mixture of olefin-free petroleum ether and ethyl ether at −20° C.

EXAMPLE 2 p-Nitrobenzoic-diethylphosphoric anhydride and p-nitroperoxybenzoic acid were prepared as described in Example 1. The anhydride was recrystallized from ethyl ether-petroleum ether cosolvent and the peroxyacid from chloroform.

EXAMPLE 3 o-Nitrobenzoic-diethylphosphoric anhydride and o-nitroperoxybenzoic acid were prepared as described in Example 1. The anhydride, a light yellow oil, was used without further purification. The peroxyacid was recrystallized from chloroform-petroleum ether cosolvent.

EXAMPLE 4

3,4,5-Trimethoxybenzoic-diethyl phosphoric anhydride and 3,4,5-trimethoxyperoxybenzoic acid were prepared as described in Example 1. The anhydride was recrystallized from ethyl ether-petroleum ether cosolvent and the peroxy-acid from chloroform-petroleum ether cosolvent.

EXAMPLE 5

2,4,6 - Trimethylbenzoic-diethyl phosphoric anhydride was prepared as described in Example 1. The peroxy acid was prepared as described for peroxyanisic acid in Example 1 except that perhydrolysis was achieved without acid catalysis. The anhydride was used without purification. The peroxyacid was crystallized from ethyl ether-petroleum ether cosolvent.

EXAMPLE 6

Cinnamoyl diethylphosphoric anhydride and peroxycinnamic acid were prepared as described in Example 1. The anhydride was used without purification. The peroxyacid was recrystallized from chloroform-petroleum ether cosolvent.

EXAMPLE 7

Stearic-diethylphosphoric anhydride and peroxystearic acid were prepared as described in Example 1. The anhydride was recrystallized from petroleum ether and the peroxyacid from ethyl ether cosolvent.

EXAMPLE 8

Pivaloyl diethylphosphoric anhydride and peroxypivalic acid were prepared as described in Example 1. The oily anhydride was used without further purification. The peroxyacid was isolated from the ether solution by addition of methylene chloride, washing with ammonium chloride saturated water, and evaporation of the solvents.

TABLE I.—PREPARATIVE CONDITIONS AND YIELDS OF PEROXY ACIDS

| Acyl chloride | Mole ratio $H_2O_2$: | ADP: | MSA* | ADP molarity | Temp., °C. | Time, hr. | Percent peroxyacid[b] |
|---|---|---|---|---|---|---|---|
| p-Methoxybenzoyl | 5 | 1 | 0.5 | 1 | 10-15 | 1 | 87 |
|  | 5 | 1 | 1 | 1 | 15 | 1 | 91 |
| 3,4,5-trimethoxybenzoyl | 5 | 1 | 1 | 2 | 15 | 1 | 88 |
| 2,4,6-trimethylbenzoyl | 5 | 1 | *0 | 6.5 | 0-5 | 0.5 | 80 |
| o-Nitrobenzoyl | 5 | 1 | 2 | 5 | 25-35 | 1.5 | 74 |
| p-Nitrobenzoyl | 5 | 1 | 2 | 2 | 25-30 | 1.5 | 87 |
| Stearoyl | 5 | 1 | 1 | 0.5 | 25-30 | 1 | 92 |
| Cinnamoyl | 5 | 1 | 1 | 2 | 20 | 1.5 | 91 |
| Pivaloyl | 5 | 1 | 1 | 1.5 | 10-15 | 1 | 72 |

[a] ADP=acyl diethyl phosphate; MSA=methanesulfonic acid; $H_2O_2$=98% concentration; reaction conducted in ethyl ether solution.
[b] Peroxy acid content of crude product determined iodometrically.
* Reaction proceeds in the absence of MSA.

We claim:
1. 3,4,5-Trimethoxybenzoic acid.
2. A process for preparing peroxy acids comprising perhydrolyzing in ethyl-ether in the presence of methane sulfonic acid catalyst with 98% hydrogen peroxide at a temperature of from 0° to 30° C., a mixed anhydride derived from a carboxylic acid and a dialkyl phosphoric acid, said anhydride having the general formula

$$(EtO)_2-P-O-CR$$
$$\quad\quad\;\; \downarrow\;\;\;\; \|$$
$$\quad\quad\;\; O\;\;\;\; O$$

in which R is selected from the group consisting of alkyl having from 2 to 24 carbon atoms and a group of the formula:

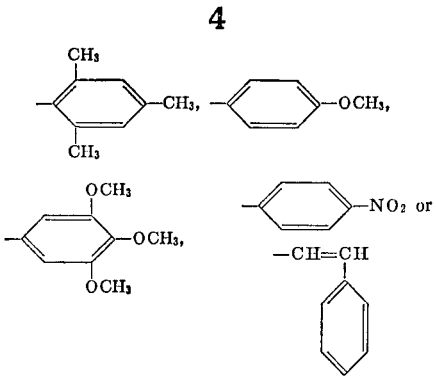

3. A process for preparing peroxy acids comprising perhydrolyzing in with 98% hydrogen peroxide at a temperature of from 0° to 30° C. a mixed anhydride derived from a carboxylic acid and a dialkyl phosphoric acid, said anhydride having the general formula $$(EtO)_2-P-O-CR$$
$$\quad\quad\;\; \downarrow\;\;\;\; \|$$
$$\quad\quad\;\; O\;\;\;\; O$$

wherein R is selected from the group consisting of

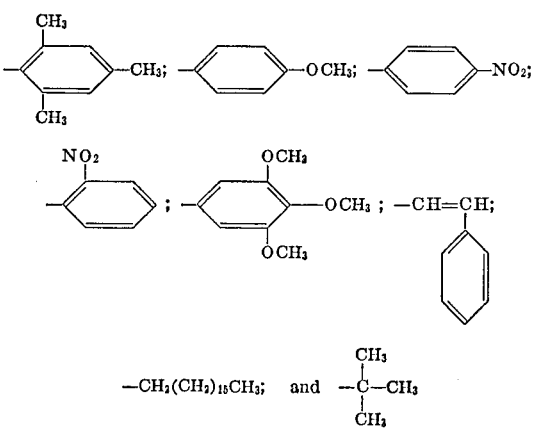

4. The process of claim 3 in which R is

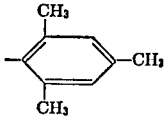

5. The process of claim 3 in which R is

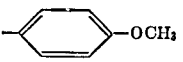

6. The process of claim 3 in which R is

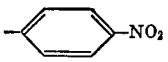

7. The process of claim 3 in which R is
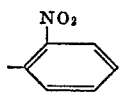
8. The process of claim 3 in which R is
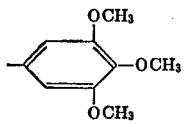
9. The process of claim 3 in which R is
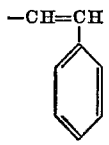
10. The process of claim 3 in which R is
—CH$_2$(CH$_2$)$_{15}$CH$_3$
11. The process of claim 3 in which R is
References Cited
UNITED STATES PATENTS
3,365,487　1/1968　Gonce _____ 260—502 R
FOREIGN PATENTS
891,211　3/1962　Great Britain ____ 260—502 R
BERNARD HELFIN, Primary Examiner
W. B. LONE, Assistant Examiner
U.S. Cl. X.R.
260—348.5 R, 406